(12) United States Patent
Hoshino et al.

(10) Patent No.: US 11,948,740 B2
(45) Date of Patent: Apr. 2, 2024

(54) POROUS CONDUCTOR HAVING CONDUCTIVE NANOSTRUCTURE AND ELECTRICITY STORAGE DEVICE USING SAME

(71) Applicants: National University Corporation Chiba University, Chiba (JP); TOMOEGAWA CORPORATION, Tokyo (JP)

(72) Inventors: Katsuyoshi Hoshino, Chiba (JP); Yousuke Sugawara, Chiba (JP); Rio Yamada, Chiba (JP); Aoi Magori, Chiba (JP); Nobuyuki Aoki, Shizuoka (JP); Keiichiro Haji, Shizuoka (JP); Daisuke Muramatsu, Shizuoka (JP)

(73) Assignees: National University Corporation Chiba University, Chiba (JP); TOMOEGAWA CORPORATION, Tokyo (JP)

(*) Notice: Subject to any disclaimer, the term of this patent is extended or adjusted under 35 U.S.C. 154(b) by 102 days.

(21) Appl. No.: 16/649,845

(22) PCT Filed: Sep. 19, 2018

(86) PCT No.: PCT/JP2018/034677
§ 371 (c)(1),
(2) Date: Mar. 23, 2020

(87) PCT Pub. No.: WO2019/059238
PCT Pub. Date: Mar. 28, 2019

(65) Prior Publication Data
US 2020/0273631 A1 Aug. 27, 2020

(30) Foreign Application Priority Data
Sep. 25, 2017 (JP) .................. 2017-183614
Feb. 22, 2018 (JP) .................. 2018-029660

(51) Int. Cl.
*H01G 11/02* (2013.01)
*H01G 11/28* (2013.01)
(Continued)

(52) U.S. Cl.
CPC ............. *H01G 11/02* (2013.01); *H01G 11/28* (2013.01); *H01G 11/30* (2013.01); *H01G 11/70* (2013.01)

(58) Field of Classification Search
CPC ........ H01G 11/70; H01G 11/30; H01G 11/28; H01G 11/02
See application file for complete search history.

(56) References Cited

U.S. PATENT DOCUMENTS

| 2010/0273051 A1* | 10/2010 | Choi | ..................... | H01M 4/045 429/218.1 |
| 2011/0097624 A1* | 4/2011 | Bhatt | ..................... | H01M 4/137 429/163 |

(Continued)

FOREIGN PATENT DOCUMENTS

| CN | 103219163 A | 7/2013 | |
| CN | 104134788 A * | 11/2014 | ............. H01G 11/46 |

(Continued)

OTHER PUBLICATIONS

International Preliminary report on Patentability for PCT/JP2018/034677 dated Mar. 31, 2020, which includes a English Translation of Written Opinion of the International Searching Authority for PCT/JP2018/034677 dated Nov. 6, 2018.
(Continued)

*Primary Examiner* — David M Sinclair
(74) *Attorney, Agent, or Firm* — Muncy, Geissler, Olds & Lowe, P.C.

(57) ABSTRACT

To provide an electrode for an electricity storage device, which electrode employs a porous conductor having con-
(Continued)

EXAMPLE 1: COPPER NANOWIRES PRODUCED ON STAINLESS METAL FIBER SHEET

STEM PART AVERAGE DIAMETER 900 nm
AVERAGE LENGTH 30 μm
BRANCH PART AVERAGE DIAMETER 250 nm
AVERAGE LENGTH 10 μm ductive nanostructures formed on its surface and makes it possible to provide a less expensive electricity storage device having a high discharge capacity and high charge/discharge cycle resistance.

A porous conductor which is used as an electrode for an electricity storage device has a plurality of conductive nanostructures on a surface of the porous conductor.

5 Claims, 6 Drawing Sheets

(51) Int. Cl.
*H01G 11/30* (2013.01)
*H01G 11/70* (2013.01)

(56) References Cited

U.S. PATENT DOCUMENTS

| | | | |
|---|---|---|---|
| 2011/0223480 | A1 | 9/2011 | Wee et al. |
| 2016/0301096 | A1 | 10/2016 | Zhamu et al. |
| 2017/0062143 | A1* | 3/2017 | Zhamu ............... H01G 11/70 |
| 2017/0098856 | A1 | 4/2017 | Zhamu et al. |
| 2020/0035381 | A1* | 1/2020 | Muramatsu ............ H01B 5/00 |

FOREIGN PATENT DOCUMENTS

| | | | | | |
|---|---|---|---|---|---|
| CN | 105023761 | A | * | 11/2015 | |
| CN | 106206053 | A | | 12/2016 | |
| CN | 106276811 | A | | 1/2017 | |
| JP | H07-258706 | A | | 10/1995 | |
| JP | 08180878 | A | * | 7/1996 | |
| JP | 2007-328939 | A | | 12/2007 | |
| JP | 2009-224623 | A | | 10/2009 | |
| JP | 2011-195865 | A | | 10/2011 | |
| JP | 2012-226961 | A | | 11/2012 | |
| JP | 2014130980 | A | * | 7/2014 | |
| JP | 2015088723 | A | * | 5/2015 | |
| JP | 2016-164957 | A | | 9/2016 | |
| WO | WO-2005071702 | A1 | * | 8/2005 | ............. H01G 11/02 |
| WO | WO-2010090956 | A2 | * | 8/2010 | ............. B82Y 30/00 |
| WO | WO-2012093880 | A2 | * | 7/2012 | ............. C25D 1/16 |

OTHER PUBLICATIONS

An office action of the corresponding TW application No. 107133199 dated Apr. 3, 2019.
An office action of the corresponding TW application No. 107133199 dated Dec. 26, 2019.
The extended European search report for the corresponding EP application No. 18859289.3 dated Apr. 30, 2021.
Office Action for the corresponding CN application No. 201880053703.7 dated Apr. 30, 2021 and English translation thereof.
Notice of Reasons for Refusal for the corresponding JP application No. 2019-543678 dated Aug. 9, 2022 and English translation thereof.
Notice of reasons for Refusal for the corresponding JP application No. 2019-543678 dated Jan. 17, 2023 and English translation thereof.

* cited by examiner

FIG. 1

EXAMPLE 1: COPPER NANOWIRES PRODUCED ON STAINLESS METAL FIBER SHEET

STEM PART AVERAGE DIAMETER 900 nm
AVERAGE LENGTH 30 μm
BRANCH PART AVERAGE DIAMETER 250 nm
AVERAGE LENGTH 10 μm

FIG. 2

EXAMPLE 5: SILVER NANOWIRES PRODUCED ON STAINLESS METAL FIBER SHEET

STEM PART AVERAGE DIAMETER 350 nm
AVERAGE LENGTH 8.5 μm
BRANCH PART NONE

EXAMPLE 7: COBALT NANOWIRES PRODUCED ON STAINLESS METAL FIBER SHEET

STEM PART  AVERAGE DIAMETER  200 nm
          AVERAGE LENGTH  20 μm
BRANCH PART  NONE

FIG. 6

POROUS CONDUCTOR HAVING CONDUCTIVE NANOSTRUCTURE AND ELECTRICITY STORAGE DEVICE USING SAME

TECHNICAL FIELD

The present invention relates to a porous conductor having conductive nanostructures and an electricity storage device employing the porous conductor.

BACKGROUND ART

Electricity storage devices are roughly divided into secondary batteries, which utilize a chemical reaction involving significant material transformation, and capacitors, which utilize no chemical reaction or a chemical reaction slightly involving material transformation on a material surface. Capacitors are further classified into electric double-layer capacitors (EDLCs) operating on the basis of a physical principle and redox capacitors operating on the basis of a chemical principle. Among these devices, secondary batteries and EDLCs are already commercially available while redox capacitors are still in a research stage. EDLCs are utilized as electricity storage devices for renewable energy (wind power and solar power) or as auxiliary power sources for hybrid cars and electric cars.

Secondary batteries have a larger discharge capacity but are problematic in output, cycle resistance, and charge/discharge time while EDLCs have a trade-off relationship between excellent output, cycle resistance, and charge/discharge time and a smaller discharge capacity. Redox capacitors are a target of intense research in the expectation that redox capacitors will guarantee the characteristics of EDLCs including output, cycle resistance, and charge/discharge time and will further overcome the disadvantageous discharge capacity.

Examples of electrode materials conventionally used for redox capacitors include ruthenium oxide, iridium oxide, manganese oxide, nickel oxide, nickel hydroxide, cobalt oxide, cobalt hydroxide, cobalt oxyhydroxide, and the like. Ruthenium oxide and iridium oxide provide adequate capacities but have not led to a commercial product because of expensiveness. Manganese oxide, nickel oxide, nickel hydroxide, cobalt oxide, cobalt hydroxide, cobalt oxyhydroxide, and others have lower discharge capacities. Patent Literature 1 proposes using metal nanowires as capacitor electrodes.

CITATION LIST

Patent Literature

Patent Literature 1: JP 2011-195865 A

SUMMARY OF INVENTION

Technical Problem

Conventional capacitors containing ruthenium oxide or iridium oxide have adequate capacities but are not commercially available yet because of expensiveness. The copper nanowires proposed in Patent Literature 1 are inexpensive but a capacitor employing the copper nanowires has an inadequate capacitance as low as about 100 F/g, and cycle resistance is not even mentioned therein.

Thus, the present invention provides a porous conductor having conductive nanostructures achieving a less expensive capacitor with a higher discharge capacity and higher cycle resistance.

Solution to Problem

The present inventors have conducted intensive studies on the above-described problems to find that a porous conductor having a certain structure formed thereon can exhibit higher discharge capacities and cycle resistance, as a consequence of which the present invention has been completed.

More specifically, the present invention (1) is a porous conductor which is used as an electrode for an electricity storage device, the porous conductor including: a substrate; and a plurality of conductive nanostructures present on the substrate.

The present invention (2) is the porous conductor according to the invention (1), in which the substrate is a metal fiber sheet.

The present invention (3) is the porous conductor according to the invention (2), in which the metal fiber sheet includes a stainless steel fiber or a copper fiber.

The present invention (4) is the porous conductor according to the inventions (1) to (3), in which the conductive nanostructures include metal.

The present invention (5) is the porous conductor according to the invention (4), in which the metal is at least one or more of silver, copper, and cobalt.

The present invention (6) is an electricity storage device including the porous conductor according to the inventions (1) to (5) as an electrode.

The present invention (7) is the electricity storage device according to the invention (6), in which the electricity storage device is a redox capacitor.

Advantageous Effects of Invention

Using the porous conductor having conductive nanostructures according to the present invention makes it possible to provide a less expensive electricity storage device having a higher capacity and higher cycle resistance.

DESCRIPTION OF EMBODIMENTS

1. Porous Conductor Having Conductive Nanostructures

A porous conductor having conductive nanostructures is a porous conductor having conductive nanostructures formed on a surface of the porous conductor serving as a substrate.

Note that the term "surface" appearing singly herein refers to surfaces including a surface of the substrate, an inner surface of a hole disposed in the substrate, a surface of a component member itself forming part of the substrate, and an inner surface of a hole or the like formed inside the substrate and communicating with an external environment. For example, in the case where a metal fiber sheet is used as the substrate, the term "surface" refers to a surface of the metal fiber sheet, a surface of a metal fiber being a component, and an inner surface of a hole formed inside the metal fiber sheet and communicating with an external environment.

A porous conductor having conductive nanostructures according to the present invention will now be described in detail.

Note that the phrase "on the substrate" appearing herein without any proviso includes the "surface" described above.

1-1. Porous Conductor

The porous conductor refers to, without specific limitations, a material that has conductivity and has porosity in its surface or in the whole porous conductor including its surfaces and inner regions. For example, the porous conductor may have a porous structure as an aggregate of powders, fibers, or the like. In this case, the components themselves, namely powders, fibers, or the like, may or may not be porous. Examples thereof include a fabric made by weaving fibers; the fabric can be structured to have holes or gaps on a surface of the fabric or throughout the fabric even if the fibers themselves are not porous.

A material having conductivity or a conductive material herein refers to a material having an electric resistivity of $1 \times 10^{10}$ Ω·m or lower. The conductivity can be measured by using a known method, such as the measurement in compliance with the method of JIS C2139:2008.

1-1-1. Material

The material for the porous conductor is not limited as long as the material has conductivity. Examples of the material include metals, ceramics, resins, glass, and graphite, and only at least one of these materials needs to be used. Alternatively, a nonconductive material may be turned into a conductive material by using a known method. Examples of such material include silicon or diamond doped with an element in group 13 such as boron or an element in group 15 such as phosphorus through ion implantation. Among these materials, metals are preferred because of being inexpensive, highly conductive, and excellent in strength, and stainless steel, copper, and carbon steel are more preferred because of being inexpensive.

Two or more of these materials may be used. Furthermore, these materials may be used in combination with a nonconductive material as long as the materials as a whole have conductivity. Examples include (1) another material layered on a surface of any of the above-mentioned materials, and (2) another material combined with any of the above-mentioned materials. Examples of (1) include a resin with a metal plated on a surface of the resin. Examples of (2) include a resin having metal powders or metal particles kneaded therewith. Known methods can be used for the layering, kneading, and so on.

1-1-2. Structure of Porous Conductor

As long as the porous conductor is a porous body as described above, the porous conductor is not limited to a specific structure but may be in any structure suitable for an electrode or any other application. Examples thereof include a plate-like object such as a polygonal, circular, or oval plate; a bar-like object such as a polygonal, cylindrical, or orval column; a solid object such as a polygonal or spherical object; a tubular object such as a polygonal or circular tube; a sheet-like object; a spring-like object; a fiber-like object; and a doughnut-like object.

The porous conductor may be an aggregate of a large number of components such as powders or fibers. Examples thereof include a bulk body produced by compression molding of powders in a die, a sheet produced by a wet papermaking process carried out on fibers, a sheet produced by a known dry nonwoven fabric process, a metal fiber sheet including metal fibers, and a sheet into which long fibers are woven. Among them, a metal fiber sheet is preferred, and a stainless steel fiber sheet and a copper fiber sheet are more preferred. Note that a metal fiber sheet may contain a material other than metals to the extent that effects of the present invention are not suppressed.

Any combination of the above-mentioned structures may also be used. For example, a plurality of fiber-like porous conductors may be twisted into the form of a bar, or a plurality of bar-like porous conductors may be bound together.

The above-described structures may further be worked on. Depending on the intended performance or application, the porous conductor may be worked on such as making holes or slits for attachment, or the porous conductor in the form of a sheet may be wound into a rolled porous conductor. For example, a sheet made from fibers by a papermaking process may be wound.

Examples of a sheet made from fibers for the porous conductor by a wet papermaking process include the metal fiber sintered sheet produced by the production method disclosed in JP H07-258706 A. The metal sintered sheet can be used for a wider range of applications and is preferred in that the sheet can be produced with preferred materials such as stainless steel fibers or copper fibers, the size and distribution of holes and gaps can be adjusted, the formed sheet can further be worked on, and the sheet can be secondarily processed into various shapes.

In the present invention, porosity not only includes having a plurality of holes but also includes having a plurality of gaps, slits, and the like. Examples of the gaps, slits, and the like include gaps between sheet-like or plate-like structures that are stacked, gaps among fibers in a produced fabric into which fibers are woven, and holes, slits, and the like made by machining a metal plate with, for example, a laser machining apparatus. These holes, gaps, and slits may or may not pass through the structure, and need only form irregularities so as to increase the surface area.

As long as a plurality of conductive nanostructures is formed, the shape, size, intervals, and the like of the holes and others are not particularly limited. For example, the holes and others may be 0.01 μm to 1,000 μm in size, preferably 0.1 μm to 500 μm, more preferably 1μm to 300 μm. An excessively small lower limit makes it difficult to form conductive nanostructures on the inside of the holes and others, while an excessively large upper limit reduces the surface area of the substrate on which conductive nanostructures are formed, resulting in lower efficiency. In either case, the discharge capacity may be reduced. The size of the holes and others can be measured by using a scanning electron microscope (hereinafter abbreviated as SEM; examples may be the ones compliant with JIS K0132:1997).

For the size of holes and others as used herein, the longest diameter (the longest side) of each of holes and others may be used, and the size may be determined by imaging randomly selected 50 holes or others with a SEM, measuring the longest diameter (the longest side) of each of the imaged holes or others, and taking an average.

1-2. Conductive Nanostructure 1-2-1. Material

The material for conductive nanostructures is not particularly limited as long as the material can be formed on the substrate and has conductivity. Examples of the material include metals, ceramics, resins, glass, and graphite, and only at least one of these materials needs to be used. Alternatively, a nonconductive material may be turned into a conductive material by using a known method. Examples of such material include silicon or diamond doped with an element in group 13 such as boron or an element in group 15 such as phosphorus through ion implantation. In the case of a method that can be used after nanostructures are formed, such as the method for adding conductivity through ion implantation, nonconductive nanostructures are formed on a surface of the substrate, and then the nonconductive nanostructures can be turned into conductive nanostructures by carrying out, for example, ion implantation. Among the above-mentioned materials, metals are preferred in view of electric conductivity and other electric characteristics; gold, platinum, silver, copper, and cobalt are more preferred; and silver, copper, and cobalt are still more preferred because of the characteristics of expressing reversible electrochemical reactions.

1-2-2. Structure

A conductive nanostructure is a nano-sized structure formed on the substrate, namely the porous conductor. The shape of the structure is not particularly limited, and examples thereof include the shape of: a grain such as a polygonal, circular, or oval grain; a plate such as a polygonal, circular, or oval plate; a needle; a column and a bar such as a polygonal, circular, or oval column and bar; a fiber; a dendrite; and a skeletal form of a growing crystal, and any combination thereof. Examples of such combination include the shape of dendrites (which may sometimes be expressed as dendritic). For example, the structure may be produced resulting from branching from a fiber-like structure, growth of the fiber-like structure, and repeated growth of other fiber-like structures from the fiber-like structure. Such complex and repetitive structures can significantly increase the surface area of conductive nanostructures formed on the porous conductor to enhance the discharge capacity and cycle resistance.

The nano-sized structure as used herein is defined as a structure in which at least one side (for example, a diameter or minor axis in a cross section) of the conductive nanostructure has a length of less than 1 µm. Likewise, a micron-sized structure is defined as a structure in which at least one side (a diameter or minor axis in a cross section) of the structure has a length of 0.001 to 1 mm.

The size of the conductive nanostructure is not particularly limited. For example, if the conductive nanostructure is a dendritic, composite structure as described above, the dendritic structure as a whole may be micron-sized in so far as at least a branch portion of the dendrites is nano-sized. In other words, the size of the conductive nanostructure itself is not particularly limited; at least part of the structure need only be a nano-sized structural portion. In another example in which the conductive nanostructure is like a fiber, at least a shorter diameter (or a minor axis) in a cross section of the fiber need only be nano-sized. In this case, the fiber is not limited to any length to the extent that effects of the present invention are not suppressed. For example, the size of the whole conductive nanostructure, that is, the maximum length of the conductive nanostructure measured from a surface of the porous conductor, may be 0.001 to 1,000 µm, preferably 0.01 to 500 µm. If the conductive nanostructure has a composite structure, the size of a nano-sized structural portion of the conductive nanostructure, that is, the length of at least one side of the nano-sized structure (a diameter or minor axis in a cross section) may be less than 1 µm, preferably 1 to 500 nm, and more preferably 5 to 300 nm.

The size of the conductive nanostructure can be measured by using a SEM (for example, those compliant with JIS K0132:1997), a transmission electron microscope (TEM; those compliant with JIS H7804:2004), or the like, although the measuring method differs depending on the size of the conductive nanostructure. A plurality of measuring methods can also be combined.

2. Method for Producing Porous Conductor Having Conductive Nanostructures

As a method for producing the porous conductor having conductive nanostructures, that is, as a method for forming conductive nanostructures on a surface of the porous conductor, a known method can be used. Examples thereof include vapor-phase deposition methods, self-assembly methods, lithography-based methods, electron beam machining, FIB machining, and electrochemical methods. A more preferred method among these is an electrochemical method, which involves lower production cost and simpler and less expensive production equipment, and a still more preferred method is, for example, the method for producing copper nanostructures according to JP 5574158 B2.

2-1. Example Formation by Electrochemical Method

The following describes a method for forming copper nanostructures by using a three-electrode method, which is a preferred example.

Figure 1:
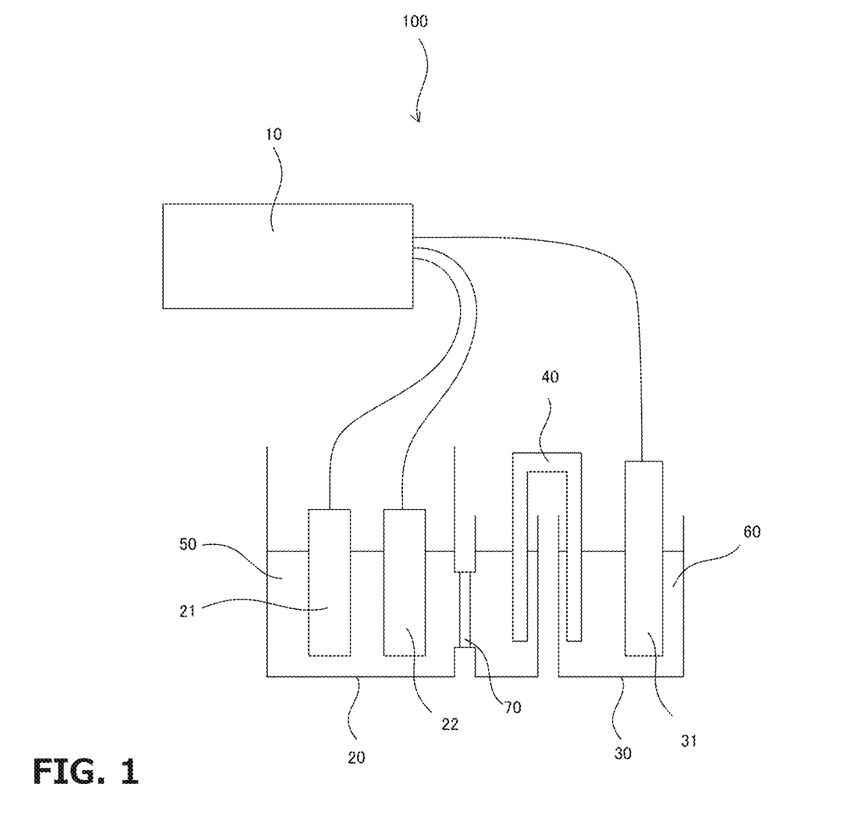
FIG. 1 is a schematic diagram of a three-electrode type device for forming conductive nanostructures.

As illustrated in FIG. 1, the employed device is a three-electrode cell device including a power source, a main chamber equipped with a working electrode and a counter electrode, a secondary chamber, a salt bridge, and a reference electrode.

The power source is not particularly limited, but the power source is preferably a potentiostat. The potentiostat is a device that maintains the potential of the working electrode at a constant level with respect to the reference electrode, providing a mechanism for accurately measuring the current between the working electrode and the counter electrode while preventing the current from flowing to the reference electrode. In the case of using a device other than a potentiostat, similar arrangements need to be made additionally.

The porous conductor is used as the working electrode. As the counter electrode, a known material may be used without specific limitations. For example, platinum may be used. As the reference electrode, a known reference electrode, such as a saturated calomel electrode, may be used without specific limitations.

Into the main chamber, an electrolyte prepared with distilled water, tetraamminecopper(II) sulfate or copper(II) sulfate as a complex of copper, lithium sulfate, and aqueous ammonia is placed. Into the secondary chamber, an electrolyzed water prepared with distilled water, lithium sulfate, and aqueous ammonia is placed.

To the reference electrode, −1.0 V to −2.0 V is applied to pass an electric quantity of 0.10 to 20 C/cm$^2$ therethrough, whereby tetraamminecopper(II) sulfate or copper(II) sulfate is reduced with two electrons and copper is deposited on the working electrode, namely the porous conductor, to form nanostructures. Passing an electric current for 0.1 to 120 minutes during the process provides conductive nanostructures formed on and inside the porous conductor.

In the case where a magnetic material is used as the porous substrate and a magnetic material is also used as the material to form conductive nanostructures, applying a magnetic field to the main chamber where the porous substrate is placed makes it easier to form conductive nanostructures because a surface of the porous substrate and the material to form conductive nanostructures are allowed to attract each other. The aforementioned material to form conductive nanostructures refers to a material corresponding to copper of the tetraamminecopper(II) sulfate in the electrolyte.

As the magnetic material, a known material may be used without specific limitations. In addition, limitations are not imposed on magnetic properties such as being paramagnetic or ferromagnetic to the extent that effects of the present invention are not suppressed. Examples of the magnetic material include nickel, iron, cobalt, gadolinium, and any alloy thereof.

A known method may be used, without specific limitations, to apply a magnetic field to the porous substrate used as the working electrode. For example, a magnetic field can be applied by placing the working electrode, which is disposed in the main chamber of the three-electrode type device as illustrated in FIG. 1, between two magnets each having a certain magnetic force.

The magnetic flux density of an applied magnetic field is not particularly limited, but may be, for example, 0.1 mT to 500 mT. Applying a magnetic field having a magnetic flux density falling within such range makes it easier to form conductive nanostructures.

3. Applications of Porous Conductor Having Conductive Nanostructures

The porous conductor having conductive nanostructures according to the present invention can be used as an electrode for an electricity storage device, or more specifically, as an electrode for redox capacitors.

EXAMPLES

The above-described porous conductor having conductive nanostructures was prepared in practice and its effects were observed. Descriptions are provided below.

(Substrate)

Every substrate to be used was formed into 1 cm×2 cm in plan view and a 1 cm×1 cm portion was immersed in the electrolyte. Materials used for the substrate are shown below.

In Examples 1 and 4, a stainless fiber sheet produced by a papermaking process and a sintering process was used as the porous substrate. The stainless fiber sheet had a fiber diameter of 8 μm, a thickness of 100 μm, a basis weight of 300 g/m$^2$, and a space factor of 33%. The basis weight means the weight of a metal fiber sheet per square meter. The space factor is the ratio of the volume occupied by metal fibers to the volume of the metal fiber sheet. A smaller space factor represents a larger number of empty spaces in the metal fiber sheet.

In Examples 2, 3, and 5, a copper fiber sheet produced by a papermaking process and a sintering process was used as the porous substrate. The copper fiber sheet had a fiber diameter of 18.5 μm, a thickness of 100 μm, a basis weight of 300 g/m$^2$, and a space factor of 33%.

In Comparative Examples 1 and 2, an ITO flat plate (made by GEOMATEC; glass with ITO film, surface resistance 10 Ω/sq.) was used instead of the porous substrate.

(Preparation of Electrolyte)

Tetraamminecopper(II) Sulfate Electrolyte

In Examples 1 and 3, 0.43 g of tetraamminecopper(II) sulfate hydrate (made by Aldrich, 98% purity) and 0.64 g of a supporting electrolyte, lithium sulfate (made by Wako Pure Chemical, 99.0% purity) were dissolved in 40.3 mL of distilled water. To the solution, 9.7 mL of aq. NH$_3$ (made by Kanto Kagaku, aqueous solution containing 29% ammonia) was added, and then the solution was stirred for 30 minutes with a magnetic stirrer to provide an electrolyte containing tetraamminecopper(II) sulfate at a concentration of 35 mM.

In Example 2 and Comparative Example 1, 0.31 g of tetraamminecopper(II) sulfate (made by Aldrich, 98% purity) and 0.64 g of a supporting electrolyte, lithium sulfate (made by Wako Pure Chemical, 99.0% purity) were dissolved in 40.2 mL of distilled water. To the solution, 9.8 mL of aq. NH$_3$ (made by Kanto Kagaku, aqueous solution containing 29% ammonia) was added, and then the solution was stirred for 30 minutes with a magnetic stirrer to provide an electrolyte containing tetraamminecopper(II) sulfate at a concentration of 25 mM.

Silver Nitrate Electrolyte

In Examples 4 and 5 and Comparative Example 2, 0.0849 g of silver nitrate (made by Merck, 99.8% purity) and 1.28 g of a supporting electrolyte, lithium sulfate (made by Wako Pure Chemical, 99.0% purity) were dissolved in 96.74 mL of distilled water, and then 3.26 mL of aq. NH$_3$ (made by Kanto Kagaku, aqueous solution containing 29% ammonia) was added to the solution, and the resulting solution was stirred for 30 minutes with a magnetic stirrer to provide an electrolyte containing silver nitrate at a concentration of 5 mM.

Hexaamminecobalt(III) Chloride Electrolyte

In Examples 6 to 9 and Comparative Example 3, 0.508 g of hexaamminecobalt(III) chloride (made by Aldrich, 99% or higher purity) and 1.28 g of a supporting electrolyte, lithium sulfate (made by Wako Pure Chemical, 99.0% purity) were dissolved in 100 mL of distilled water, and the solution was stirred for 30 minutes with a magnetic stirrer to provide an electrolyte containing hexaamminecobalt at a concentration of 19 mM.

(Apparatus for Producing Porous Conductor Having Conductive Nanostructures)

Evaluation samples having conductive nanostructures were prepared by using a three-electrode method as illustrated in FIG. 1. A potentiostat (made by Hokuto Denko, model HAB-151) was used as the power source, and a three-electrode cell was connected thereto as illustrated in FIG. 1.

The prepared electrolyte was put into the main chamber of the electrolysis cell. In Examples 1 to 3 and Comparative Example 1, the corresponding electrolytes as described above except tetraamminecopper(II) sulfate were prepared and put into the respective secondary chambers. In Examples 4 and 5 and Comparative Example 2, the corresponding electrolytes as described above except silver nitrate were prepared and put into the respective secondary chambers.

The substrates in their respective examples and comparative examples described above were each used for the working electrode terminal on the potentiostat, and a platinum plate was used for the counter electrode terminal. In Examples 1 to 3 and Comparative Example 1, a saturated calomel electrode (made by TOA Electronics, model HC-205C, hereinafter abbreviated as SCE) was connected to the reference electrode terminal. In Examples 4 and 5 and Comparative Example 2, a saturated KCl silver-silver chloride reference electrode (made by BAS Inc., model Re-1CP, hereinafter abbreviated as Ag/AgCl) was connected to the reference electrode terminal.

(Producing Porous Conductor Having Conductive Nanostructures)

Examples 1 to 3 and Comparative Example 1

A potential of −1.45 V was applied to the working electrode to pass an electric quantity of 3.0 C/cm$^2$ therethrough. In the cases of Examples 1 to 3 and Comparative Example 1, tetraamminecopper(II) sulfate in the main chamber is then reduced with two electrons and copper is deposited. At the same time, since ammonia functions as a morphology controller, copper is deposited not simply in the form of films but in the form of nanowires in various shapes such as dendrites, fibers, bars, and needles. After the electrolysis was finished, the substrate where copper nanowires were formed was removed from the electrolyte, and then repeatedly washed with distilled water, whereby capacitor electrodes according to Examples 1 to 3 and Comparative Example 1 were obtained.

Examples 4 and 5 and Comparative Example 2

A potential of −1.1 V was applied to the working electrode to pass an electric quantity of 2.0 C/cm$^2$ therethrough. A diamminesilver(I) ion is then reduced with one electron and silver is deposited. At the same time, since ammonia functions as a morphology controller, silver is deposited not simply in the form of films but in the form of nanowires in various shapes such as dendrites, fibers, bars, and needles. After the electrolysis was finished, the substrate where silver nanowires were formed was removed from the electrolyte, and then repeatedly washed with distilled water, whereby capacitor electrodes according to Examples 4 and 5 and Comparative Example 2 were obtained.

Examples 6 to 9 and Comparative Example 3

A potential of −1.07 V was applied to the working electrode to pass an electric quantity of 3.0 C/cm$^2$ therethrough. A hexaamminecobalt(III) ion is then reduced with two electrons and cobalt is deposited. At the same time, since ammonia functions as a morphology controller, cobalt is deposited not simply in the form of films but in the form of nanowires in various shapes such as dendrites, fibers, bars, and needles. After the electrolysis was finished, the substrate where cobalt nanowires were formed was removed from the electrolyte, and then repeatedly washed with distilled water, whereby capacitor electrodes according to Examples 6 and 7 and Comparative Example 3 were obtained.

In addition, capacitor electrodes according to Examples 8 and 9 were obtained by applying a potential of −1.07 V to the working electrode to pass an electric quantity of 2.0 C/cm$^2$ therethrough while further applying a magnetic field of 90 mT intensity in a direction perpendicular to the working electrode.

Figure 5:
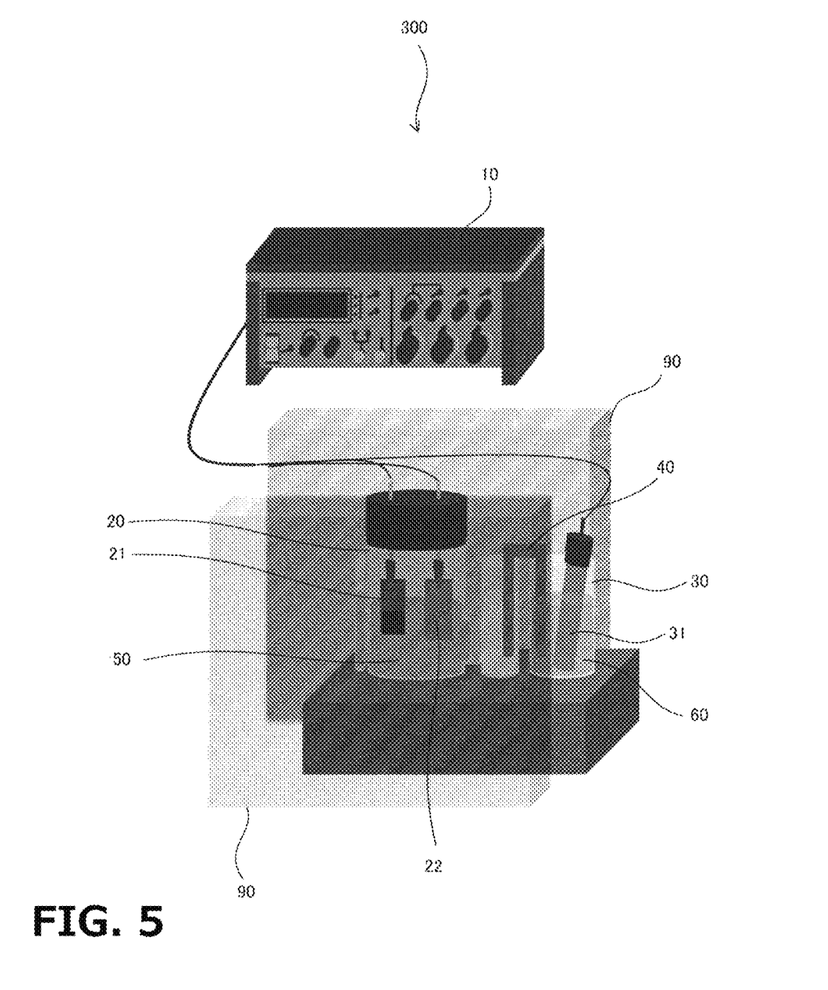
FIG. 5 is a schematic diagram of a three-electrode type device for forming conductive nanostructures with a magnetic field applied (a magnetic-field applied electrolysis system).
Figure 6:
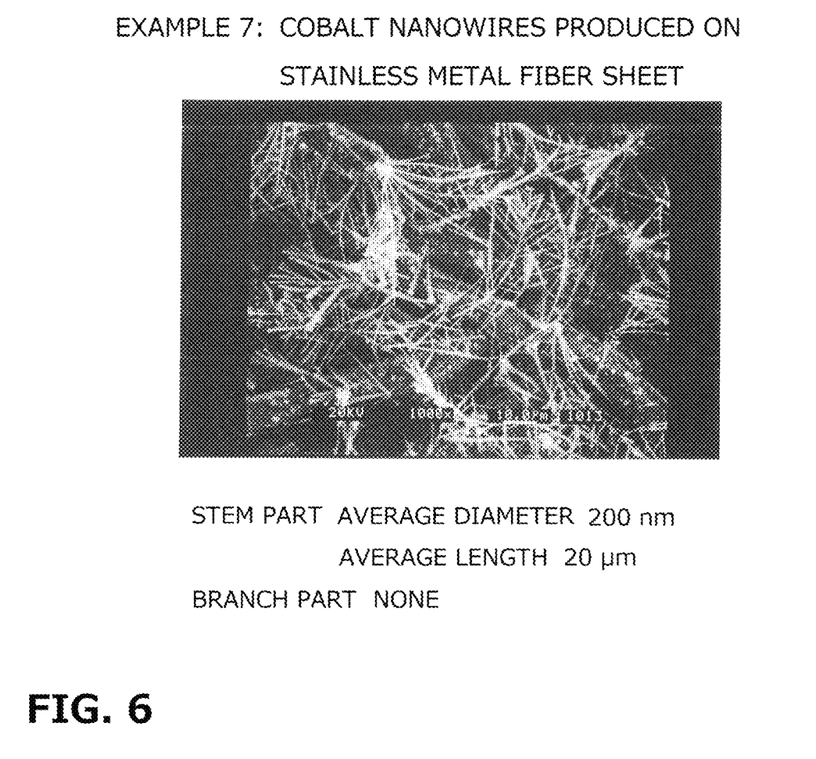
FIG. 6 is a scanning electron micrograph of conductive nanostructures (cobalt nanowires) produced in Example 7.

FIG. 5 shows a schematic diagram of a device (magnetic-field applied electrolysis system 300) used for the case of applying a magnetic field. A device similar to the device for preparing the other examples and comparative examples was placed between two neodymium magnets facing each other so that the main chamber of the device is sandwiched, and the magnetic field intensity was set to 90 mT by adjusting the distance between the magnets. The porous substrate in the main chamber and the two magnets were placed such that lines of magnetic force pass through a plane of the porous substrate in a direction perpendicular to the plane. The magnetic field intensity was measured by using the TESLA meter TM-701 made by KANETEC.

(Evaluation Method)

SEM Observation

Figure 2:
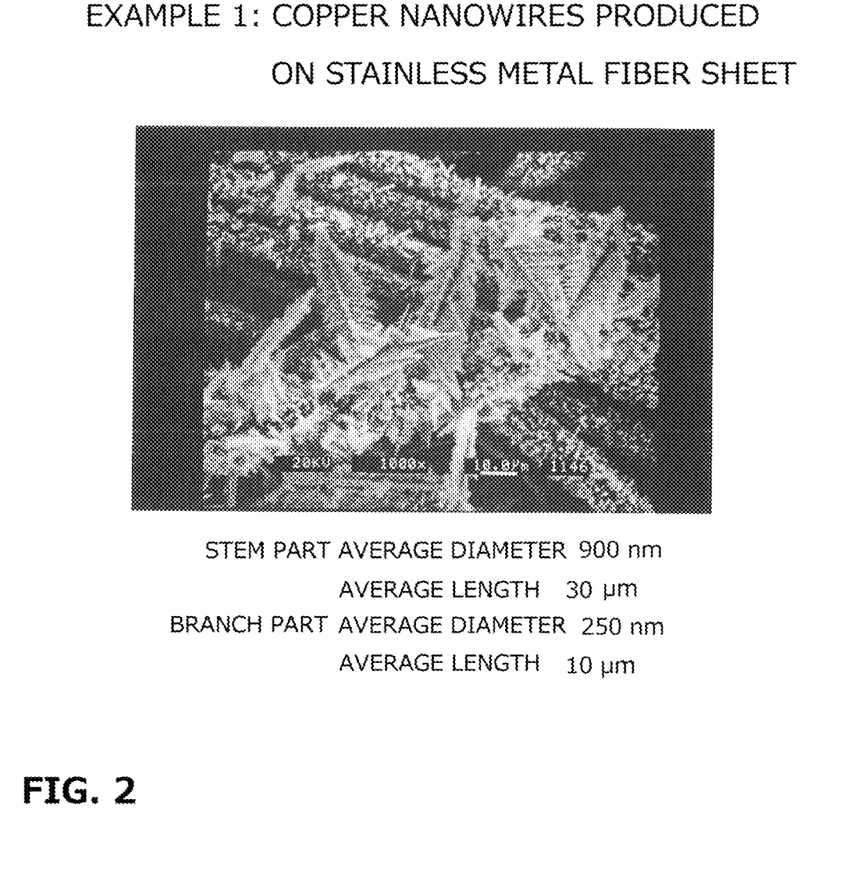
FIG. 2 is a scanning electron micrograph of conductive nanostructures (copper nanowires) produced in Example 1.
Figure 3:
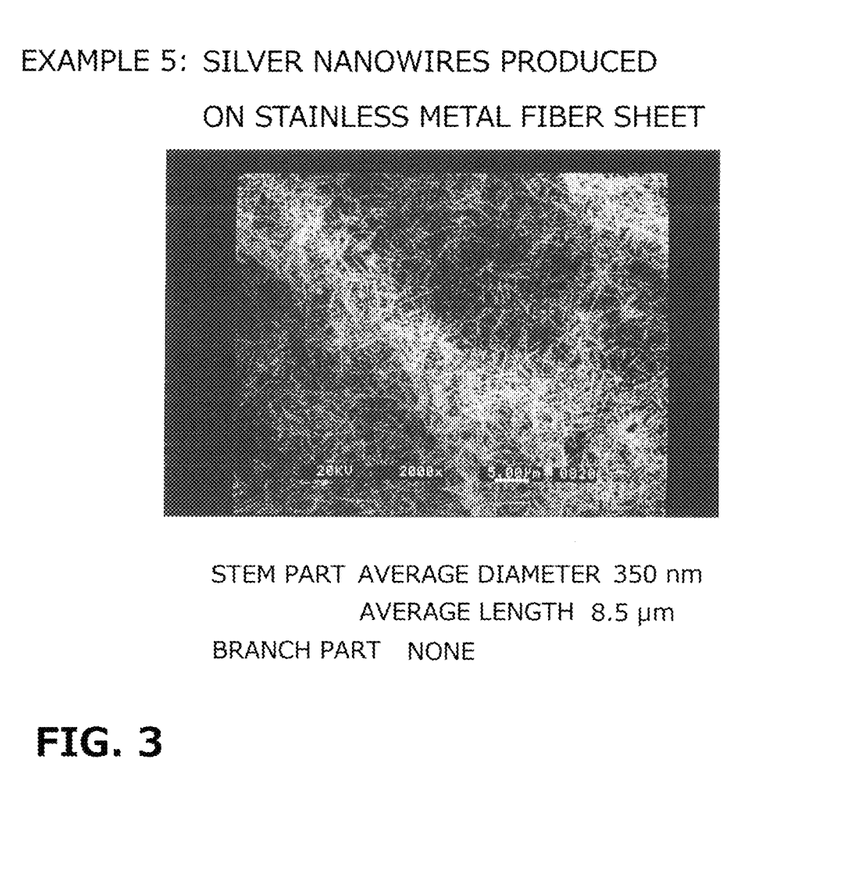
FIG. 3 is a scanning electron micrograph of conductive nanostructures (silver nanowires) produced in Example 5.

Conductive nanostructures according to Examples 1 to 5 and Comparative Examples 1 and 2 were observed with a SEM (ABT-32 made by TOPCON). It was confirmed that dendritic conductive nanostructures were formed in Examples 1 to 4 and Comparative Examples 1 and 2. Not dendritic but bar-like conductive nanostructures were observed in Example 5 only. As representative observed photographs, FIG. 2 shows a SEM-observed photograph in Example 1 and FIG. 3 shows a SEM-observed photograph in Example 5. A portion corresponding to a stem of dendrites is herein called a stem part and a portion further growing from the stem part is herein called a branch part. An average length and an average diameter of stem parts and branch parts were obtained by randomly selecting 50 stem or branch parts from a SEM-observed photograph, measuring their lengths, and calculating an average. For taking an average diameter, the width of a stem part or a branch part on a SEM-observed photograph was regarded as a diameter. Concerning the bar-like conductive nanostructures in Example 5, similar observations were made while bar-like portions were regarded as stem parts of dendrites. Results are shown in Table 1.

Charge/Discharge Test

Figure 4:
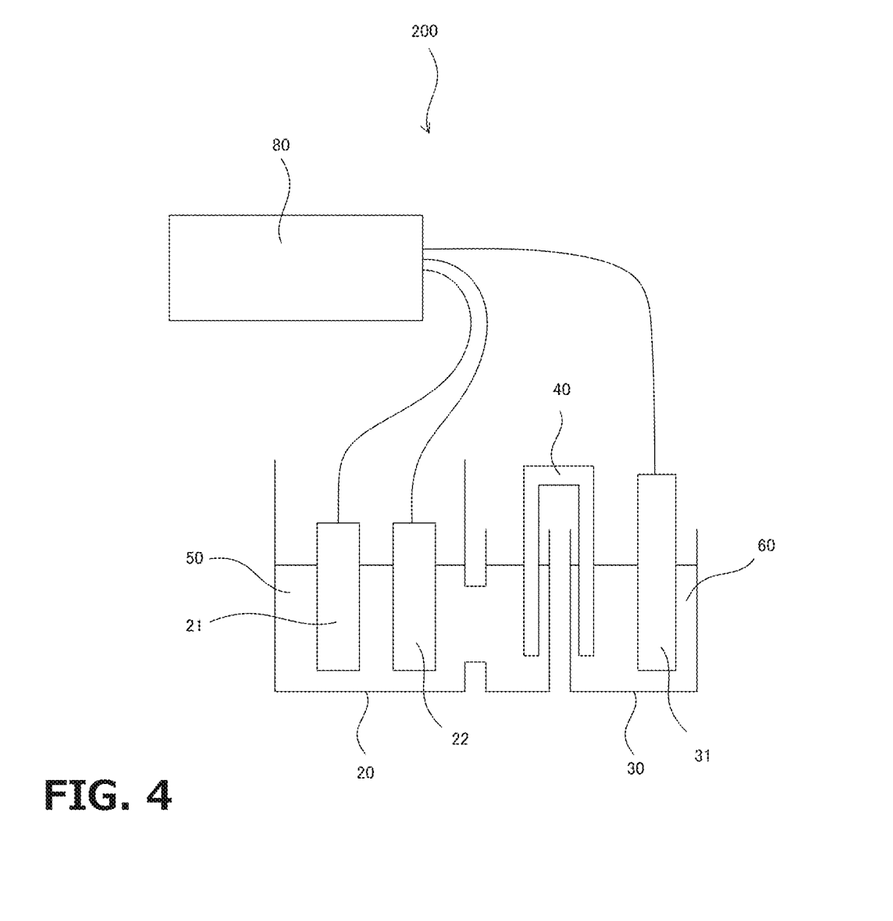
FIG. 4 is a schematic diagram of a charge/discharge device.

Charge/discharge tests were conducted with a device illustrated in FIG. 4. A charge/discharge unit (made by Hokuto Denko, model HJ1010mSM8A) was used as the power source, the electrodes according to Examples 1 to 5 and Comparative Examples 1 and 2 were used as the working electrode, a platinum plate was used for the counter electrode terminal, and an SCE was connected to the reference electrode terminal. A chamber made of polystyrene was used as the main chamber 20, and a 0.1 M lithium hydroxide solution was used as the electrolyte. Measurement was carried out at a current density of 5.6 A/g. Results are shown in Table 1.

Cycle Resistance Test

The above-described charge/discharge test was repeated 1,000 times. Results are shown in Table 1. Comparative Example 2 became nonreactive at the 500th charge/discharge, failing to withstand 1,000 cycle tests.

(Evaluation)

Evaluation results are summarized in Table 1.

At the 1st and 1,000th charge/discharge tests, each of the examples and comparative examples exhibited higher discharge capacities. At the 1,000th charge/discharge test, the examples showed better results than the comparative examples. Comparative Example 2 become nonreactive at the 500th charge/discharge, failing to withstand 1,000 charge/discharge tests. As a consequence of the foregoing, effects of the present invention are recognized.

TABLE 1

| | | Conductive nanostructure | | | | | | | Discharge capacity (μAh) | |
|---|---|---|---|---|---|---|---|---|---|---|
| | | Material | | Appearance | Shape | | | | | |
| | | | | | Stem part | | Branch part | | | |
| | Substrate | Metal complex | *1 | shape | *2 | *3 | *2 | *3 | 1st | 1000th |
| Example 1 | Stainless steel fiber sheet | Tetraamminecopper(II) sulfate | 35 mM | Dendritic | 900 | 30 | 250 | 10 | 116 | 101 |
| Example 2 | Copper fiber sheet | Tetraamminecopper(II) sulfate | 25 mM | Dendritic | 600 | 60 | 300 | 10 | 540 | 18 |
| Example 3 | Copper fiber sheet | Tetraamminecopper(II) sulfate | 35 mM | Dendritic | 550 | 50 | 250 | 10 | 524 | 16 |
| *4 | ITO (flat plate) | Tetraamminecopper(II) sulfate | 25 mM | Dendritic | 550 | 80 | 250 | 40 | 102 | 14 |
| Example 4 | Copper fiber street | Silver nitrate | 5 mM | Dendritic | 220 | 6.5 | 45 | 1.3 | 348 | 16 |
| Example 5 | Stainless steel fiber sheet | Silver nitrate | 5 mM | Bar-like | 350 | 8.5 | — | — | 21 | 20 |
| *5 | ITO (flat plate) | Silver nitrate | 5 mM | Dendritic | 150 | 8 | 45 | 1 | 23 | — |
| Example 6 | Copper fiber street | Hexaamminecobalt(III) chloride | 19 mM | Bar-like | 300 | 15 | — | — | 955 | 33 |
| Example 7 | Stainless steel fiber sheet | Hexaamminecobalt(III) chloride | 19 mM | Bar-like | 200 | 20 | — | — | 67 | 43 |
| *6 | ITO (flat plate) | Hexaamminecobalt(III) chloride | 19 mM | Bar-like | 200 | 25 | — | — | 16 | 11 |
| Example 8 | Copper fiber street | Hexaamminecobalt(III) chloride | 19 mM | Bar-like | 300 | 15 | — | — | 755 | 33 |
| Example 9 | Stainless steel fiber sheet | Hexaamminecobalt(III) chloride | 19 mM | Bar-like | 200 | 25 | — | — | 95 | 61 |

*1 = Electrolyte concentration
*2 = Average diameter (nm)
*3 = Average length (μm)
*4 = Comparative Example 1
*5 = Comparative Example 2
*6 = Comparative Example 3

REFERENCE SIGNS LIST

100 Three-electrode device
200 Charge/discharge device
10 Power source (e.g., potentiostat)
20 Main chamber
21 Working electrode
22 Counter electrode
30 Secondary chamber
31 Reference electrode
40 Salt bridge
50, 60 Electrolyte
70 Glass filter
80 Charge/discharge unit
90 Magnet
300 Magnetic-field applied electrolysis system

The invention claimed is:

1. A porous conductor comprising:
a substrate; and
a plurality of conductive nanostructures present on the substrate,
wherein the substrate is a sintered metal fiber sheet that is formed with metal fibers such that a plurality of holes is formed among the metal fibers, wherein an average diameter of the holes is ranged from 1 to 300 μm, and the average diameter of the holes are calculated using at least fifty of the holes and referring to a longest diameter of each of the holes,
wherein the conductive nanostructures include metal,
wherein the shape of the conductive nanostructures is a dendrite,
wherein the conductive nanostructures are directly attached to the metal fibers included in the metal fiber sheet.

2. The porous conductor according to claim 1, wherein the metal fiber sheet includes a stainless steel fiber or a copper fiber.

3. The porous conductor according to claim 1, wherein the metal is at least one or more of silver, copper, and cobalt.

4. An electricity storage device comprising the porous conductor according to claim 1 functioning as an electrode.

5. The electricity storage device according to claim 4, wherein the electricity storage device is a redox capacitor.

* * * * *